(12) United States Patent
Suzuki et al.

(10) Patent No.: US 9,663,644 B2
(45) Date of Patent: May 30, 2017

(54) RESIN MATERIAL HAVING NON-OHMIC PROPERTIES, METHOD FOR PRODUCING SAME, AND NON-OHMIC RESISTOR USING SAID RESIN MATERIAL

(71) Applicant: OTOWA ELECTRIC CO., LTD., Osaka-shi (JP)

(72) Inventors: Toshihiko Suzuki, Hyogo (JP); Kenta Hiwatari, Hyogo (JP); Naoyuki Tsukamoto, Hyogo (JP); Hideyuki Okinaka, Hyogo (JP)

(73) Assignee: OTOWA ELECTRIC CO., LTD., Osaka-Shi (JP)

( * ) Notice: Subject to any disclaimer, the term of this patent is extended or adjusted under 35 U.S.C. 154(b) by 57 days.

(21) Appl. No.: 14/895,253

(22) PCT Filed: Sep. 22, 2014

(86) PCT No.: PCT/JP2014/075032
§ 371 (c)(1),
(2) Date: Dec. 2, 2015

(87) PCT Pub. No.: WO2015/046125
PCT Pub. Date: Apr. 2, 2015

(65) Prior Publication Data
US 2016/0177074 A1    Jun. 23, 2016

(30) Foreign Application Priority Data
Sep. 26, 2013    (JP) .................................. 2013-200595

(51) Int. Cl.
*H01C 7/10* (2006.01)
*C08L 23/06* (2006.01)
(Continued)

(52) U.S. Cl.
CPC ................ *C08L 23/06* (2013.01); *C08K 3/04* (2013.01); *C08K 3/08* (2013.01); *C08K 3/28* (2013.01);
(Continued)

(58) Field of Classification Search
CPC ............. H01C 7/10; H01C 7/12; H01C 7/105
(Continued)

(56) References Cited

U.S. PATENT DOCUMENTS 5,669,381 A * 9/1997 Hyatt ..................... H01C 7/105
                                                        252/500
6,469,611 B1 * 10/2002 Kluge-Weiss ......... H01C 7/112
                                                        338/20
(Continued)

FOREIGN PATENT DOCUMENTS

JP    2002-506578    2/2002
JP    2005-510040    4/2005
(Continued)

OTHER PUBLICATIONS

"Percolation theory", [online], Aug. 8, 2010 [searched on Aug. 21, 2013], Internet <URL: http://d.hatena.ne.jp/miyubinamakemono/20100808/1281142704>, Discussed in specification, English abstract included.
(Continued)

*Primary Examiner* — Kyung Lee
(74) *Attorney, Agent, or Firm* — Rankin, Hill & Clark LLP

(57) ABSTRACT

Provided is a resin material having non-ohmic properties which has favorable characteristics as a varistor and has a high degree of molding freedom and impact resistance. A resin material 10 comprises: an insulating matrix 11 made of a first resin material; an island-form conductive dispersed phase 12 made of a conductive second resin material which
(Continued)

is incompatible with the first resin material and is more wettable to a microvaristor 13 described later than the first resin material is, wherein the island-form conductive dispersed phase is dispersed in an island form in the matrix and has a volume ratio of less than 16% in the whole resin material; and a microvaristor 13 comprising ceramic particles having non-ohmic properties, wherein the ceramic particles are dispersed in the matrix 11 and electrically contacted with each other via the island-form conductive dispersed phase 12.

10 Claims, 6 Drawing Sheets

(51) Int. Cl.

| | | |
|---|---|---|
| *H01C 7/12* | (2006.01) | |
| *H01C 7/105* | (2006.01) | |
| *C08L 77/00* | (2006.01) | |
| *C08K 3/04* | (2006.01) | |
| *C08K 3/08* | (2006.01) | |
| *C08K 3/28* | (2006.01) | |
| *C08K 3/34* | (2006.01) | |
| *C08L 81/02* | (2006.01) | |
| *H01B 1/22* | (2006.01) | |
| *H01B 1/24* | (2006.01) | |

(52) U.S. Cl.
CPC ............... *C08K 3/34* (2013.01); *C08L 77/00* (2013.01); *C08L 81/02* (2013.01); *H01B 1/22* (2013.01); *H01B 1/24* (2013.01); *H01C 7/10* (2013.01); *H01C 7/105* (2013.01); *H01C 7/12* (2013.01); *C08K 2003/085* (2013.01); *C08K 2003/0806* (2013.01); *C08K 2003/0831* (2013.01); *C08K 2003/0862* (2013.01); *C08L 2203/20* (2013.01)

(58) Field of Classification Search
USPC ...................................... 338/21, 13
See application file for complete search history.

(56) References Cited

U.S. PATENT DOCUMENTS

| | | | |
|---|---|---|---|
| 2001/0010617 A1* | 8/2001 | Miyazaki ............ | H01F 17/0013 361/321.2 |
| 2002/0130301 A1* | 9/2002 | Chun-Yuan ............ | H01C 7/118 252/500 |
| 2006/0269864 A1* | 11/2006 | Tarnawskyj ........ | G03G 15/0233 428/35.7 |
| 2009/0045907 A1* | 2/2009 | Hoidis ................. | H01C 7/1006 338/21 |
| 2009/0200521 A1* | 8/2009 | Hoidis ................... | H01C 7/105 252/514 |

FOREIGN PATENT DOCUMENTS

| | | |
|---|---|---|
| JP | 2008-544455 | 12/2008 |
| JP | 2009-152399 | 7/2009 |
| JP | 2012-504870 | 2/2012 |
| JP | 4921623 | 2/2012 |
| WO | 99/56290 | 11/1999 |
| WO | 02/091398 | 11/2002 |
| WO | 2006/136040 | 12/2006 |
| WO | 2010/039902 | 4/2010 |

OTHER PUBLICATIONS

"Mechanism of percolation phenomenon of conductive composite (lecture I)," edited by Technical Information Institute Co., Ltd., p. 6, Discussed in specification, English abstract included.
International Search Report, Date of mailing: Dec. 16, 2014 (Dec. 16, 2014).

* cited by examiner

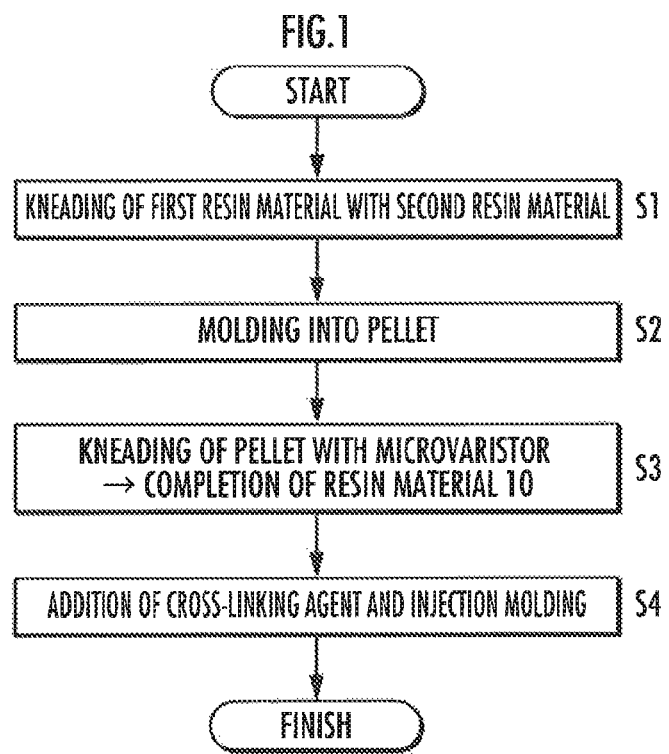
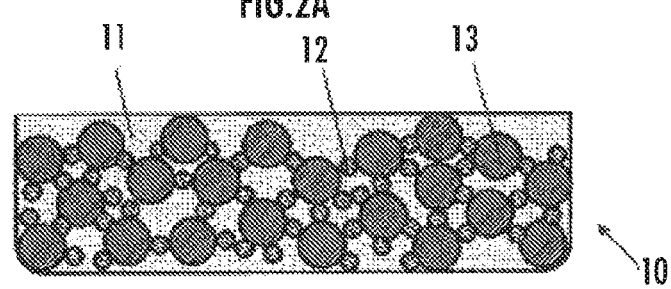
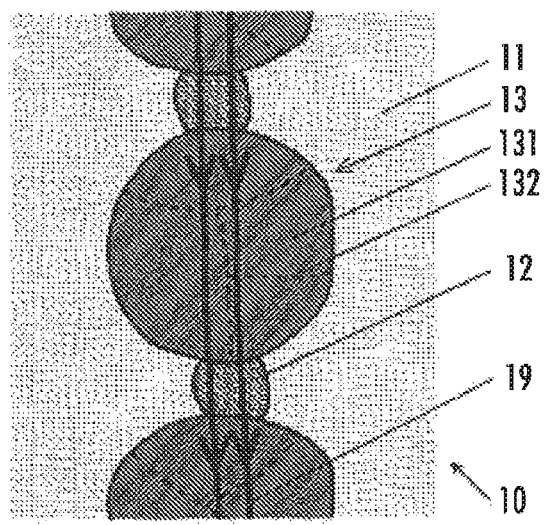

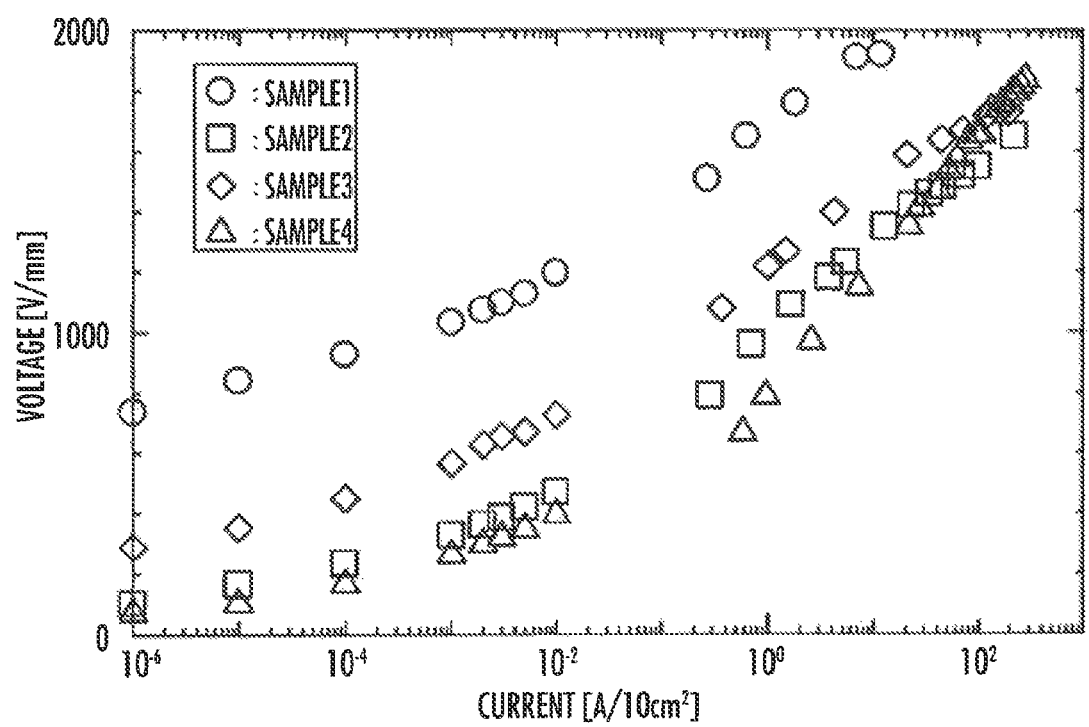

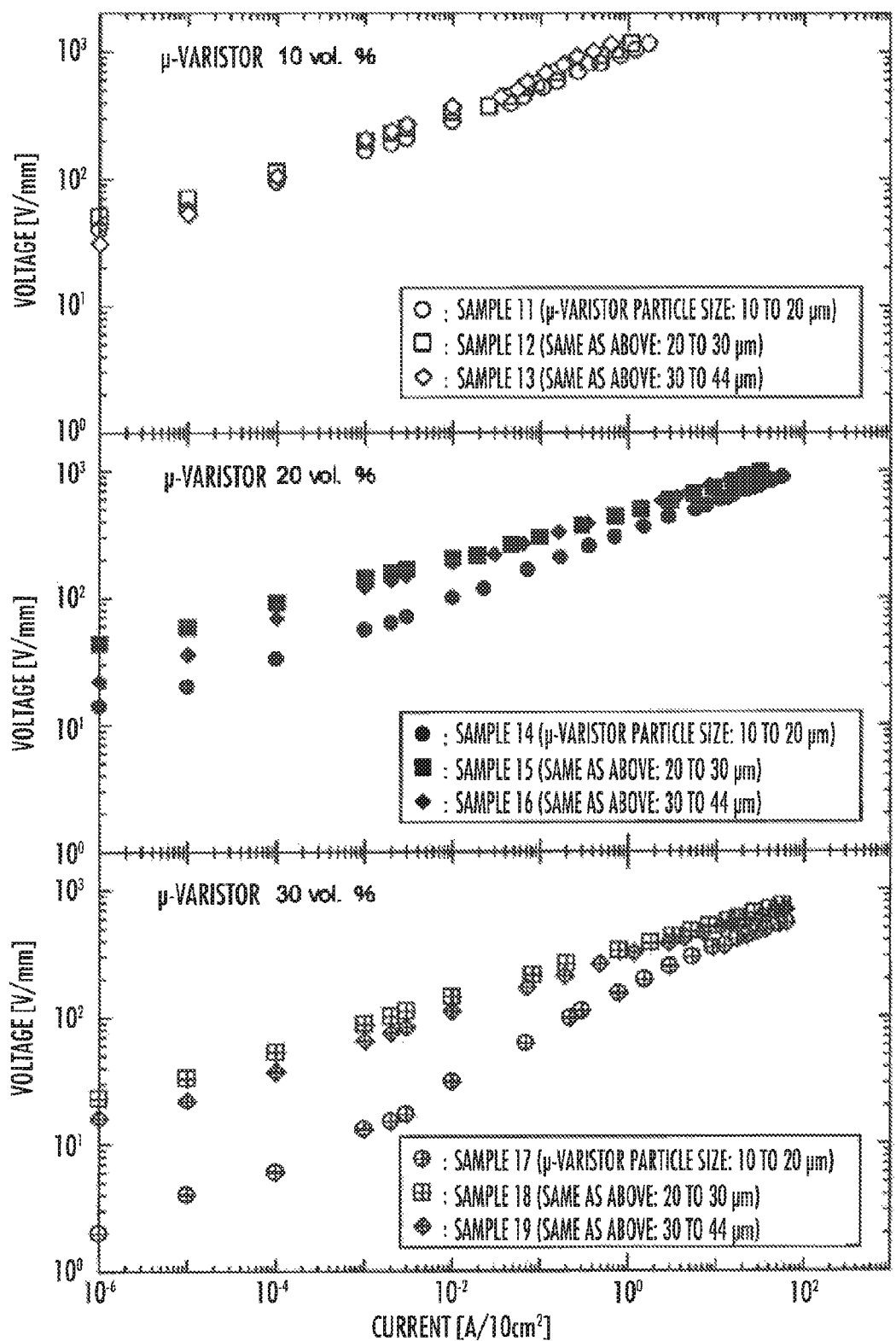

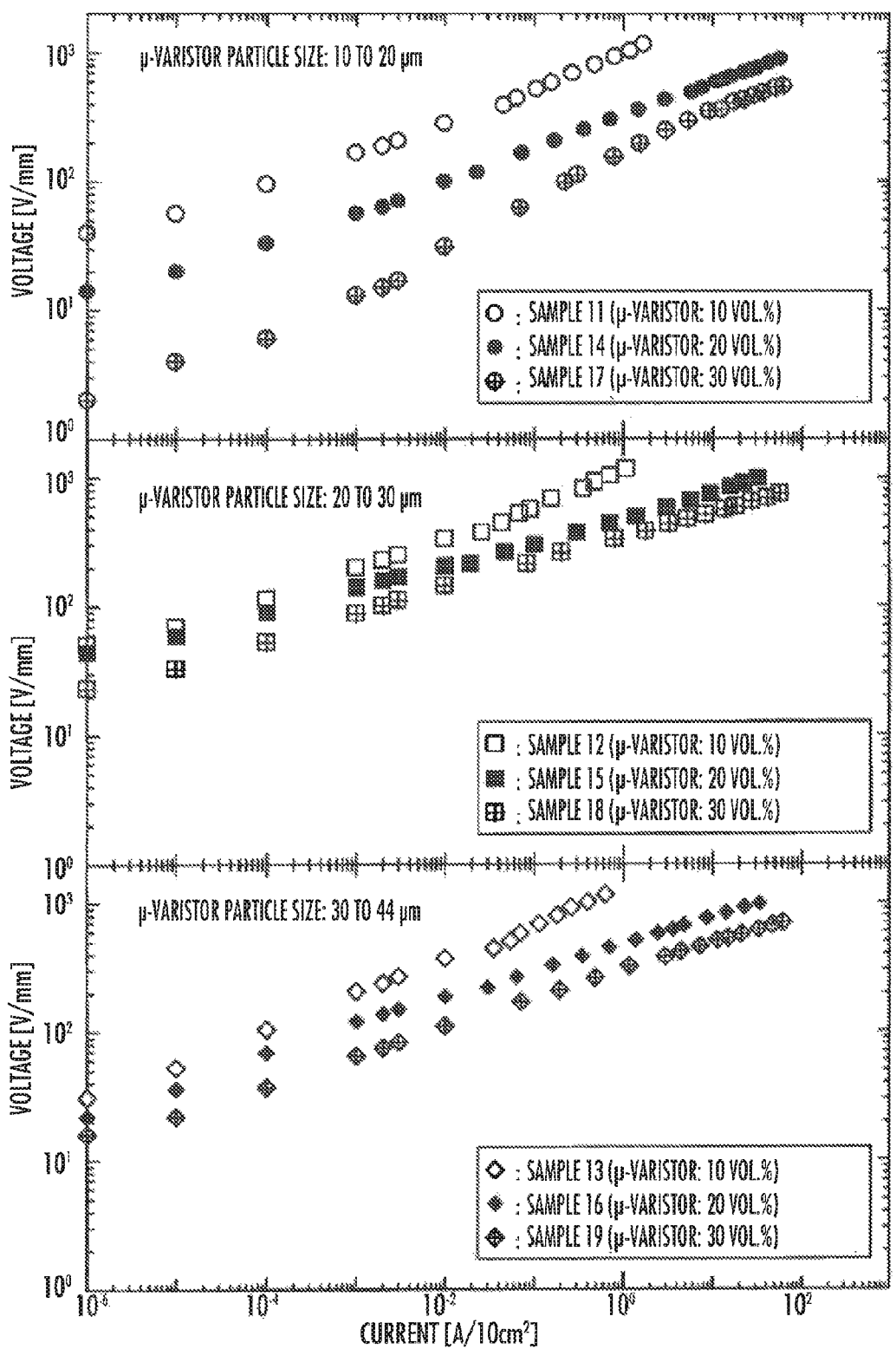

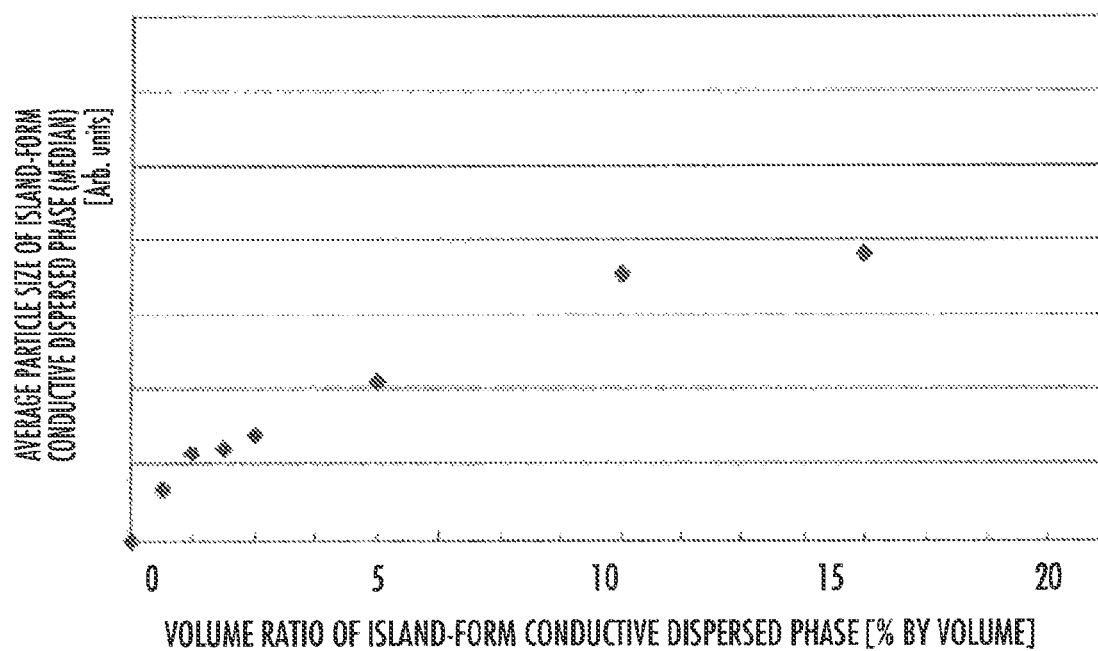

RESIN MATERIAL HAVING NON-OHMIC PROPERTIES, METHOD FOR PRODUCING SAME, AND NON-OHMIC RESISTOR USING SAID RESIN MATERIAL

TECHNICAL FIELD

The present invention relates to a resin material having non-ohmic properties which is excellent in surge resistance that protects electrical equipment from surge voltage generated by lightening, opening and closing of a circuit, etc., and a method for producing the same, and a non-ohmic resistor obtained using the resin material.

BACKGROUND ART

Varistors are devices having non-ohmic properties in which current rapidly increases with increase in voltage. The varistors are used for the purpose of protecting electric circuits from surge voltage by use of such non-ohmic properties. Specifically, a varistor is connected in parallel to equipment to be protected. As a result, the varistor keeps insulation against an earth under normal voltage, whereas upon application of surge voltage to an electric circuit, the varistor can dissipate current to an earth without elevating voltage at both ends thereof, and therefore prevents the voltage of the electric circuit from exceeding the withstand voltage of the equipment to be protected.

Various materials for varistors have heretofore been known, and one example thereof includes ceramic obtained by adding metal (e.g., Bi, Sb, Co, or Mn) oxide to a main component ZnO (zinc oxide) and firing the mixture. This material is a polycrystal composed of main-phase zinc oxide particles and a grain boundary layer composed mainly of bismuth oxide, and has a fine structure where spinel particles made of Zn and Sb are irregularly scattered in the polycrystal. Transition metal (e.g., Co or Mn) oxide is present in a solid solution form in the main phase, the grain boundary layer, and the spinel particles. In this material, current passes through the interface between the zinc oxide particles and the grain boundary layer, thereby exhibiting non-ohmic properties. Such a material, however, has the disadvantages attributed to ceramic that the material has a low degree of molding freedom and also has low impact resistance because of being rigid and fragile.

Thus, studies have been made on the preparation of a non-ohmic resistor having a high degree of molding freedom and high impact resistance by kneading a resin material with a varistor powder (microvaristor). Patent Literature 1 describes a non-ohmic resistor containing an insulating matrix based on a polymer such as an epoxy resin, and a filler in a powder form embedded in the matrix. In this literature, the filler used is obtained by mixing particles of a microvaristor having non-ohmic properties with conductive particles, followed by heat treatment to bond the conductive particles contacted with the surface of the microvaristor to the microvaristor. In Patent Literature 1, nearly spherical particles made of the ceramic mentioned above are used in the microvaristor. Also, particles (e.g., made of Ni) that have a smaller size and higher conductivity than those of the microvaristor and have a high-aspect ratio shape, such as a plate, flake, or short fiber shape, which is easy to contact with the surface of the microvaristor are used as the conductive particles.

In this non-ohmic resistor, in order to form a current pathway, the number of microvaristors is increased, while two microvaristors differing in particle size are used so that the smaller microvaristor particles enter into the gaps in the larger microvaristor particles, thereby increasing the density of the microvaristor particles. The thus-increased density of the microvaristor particles increases the number of points of contact between the microvaristor particles (via the conductive particles). As a result, the current pathway is formed, thereby exhibiting non-ohmic properties.

Since this non-ohmic resistor contains a matrix based on a polymer, a component (e.g., switch) of electrical equipment can be used in itself as a varistor by coating the surface of the component with the non-ohmic resistor by a casting method or painting the surface with the non-ohmic resistor.

CITATION LIST

Patent Literature

Patent Literature 1: Japanese Patent No. 4921623

Non Patent Literature

Non Patent Literature 1: "Mechanism of percolation phenomenon of conductive composite (lecture I)," edited by Technical Information Institute Co., Ltd., p. 6
Non Patent Literature 2: "Percolation theory," [online], Aug. 8, 2010, [searched on Aug. 21, 2013], Internet <URL: http://d.hatena.ne.jp/miyubinamakemono/20100808/1281142704>

SUMMARY OF INVENTION

Technical Problem

The non-ohmic resistor described in Patent Literature 1, however, is difficult to produce as a bulk product. This is because the microvaristor has a higher specific gravity than that of the matrix and therefore has a nonuniform density of the microvaristor particles due to the sedimentation of the microvaristor particles during preparation. Thus, the non-uniform density of the microvaristor particles can be overcome if the sedimentation rate is decreased by use of a highly viscous matrix and the filler (microvaristor and conductive particles) is sufficiently kneaded and dispersed and then cured in a short time. Excessive kneading, however, causes the matrix to enter between the adjacent microvaristor particles. This increases the contact resistance between the microvaristor particles and reduces surge characteristics against large current. Accordingly, the entrance of the matrix into between the adjacent microvaristor particles can be reduced by further using a resin that is less wettable to the microvaristor as the matrix. As a result, the surface of the microvaristor has a portion uncovered with the matrix. This microvaristor loses favorable insulating characteristics against small current. In addition, the portion uncovered with the matrix forms a void (bubble) and becomes the cause of insulation breakdown resulting from electric discharge.

Since the non-ohmic resistor described in Patent Literature 1 has an increased density of the microvaristor particles in order to obtain a current pathway, the content rate of solid matter is increased. For this non-ohmic resistor, therefore, an injection molding method generally used in resin molding is difficult to apply, and in addition, impact resistance is also reduced.

A problem to be solved by the present invention is to provide a resin material having non-ohmic properties which has favorable characteristics as a varistor, permits injection molding, and has a high degree of molding freedom and also high impact resistance, and a method for producing the same, and a non-ohmic resistor obtained using the resin material.

Solution to Problem

The present invention made to solve the problem provides a resin material having non-ohmic properties in which current rapidly increases with increase in voltage, comprising:

a) an insulating matrix made of a first resin material;

b) an island-form conductive dispersed phase made of a conductive second resin material which is incompatible with the first resin material and is more wettable to a microvaristor described later than the first resin material is, wherein the island-form conductive dispersed phase is dispersed in an island form in the matrix and has a volume ratio of less than 16% in the whole resin material; and c) a microvaristor comprising ceramic particles having non-ohmic properties, wherein the ceramic particles are dispersed in the matrix and electrically contacted with each other via the island-form conductive dispersed phase.

In this context, if the volume ratio of the island-form conductive dispersed phase in the resin material is 16% or more, theoretically, characteristics as a varistor cannot be obtained due to the occurrence of percolation. In the present invention, therefore, the volume ratio of the island-form conductive dispersed phase is set to less than 16%.

An "island" derived from the second resin material is formed in "sea" derived from the first resin material by kneading the first resin material with the second resin material, because the first resin material and the second resin material are incompatible with each other. In the present invention, the sea derived from the first resin material is referred to as a "matrix," and the island derived from the second resin material is referred to as an "island-form conductive dispersed phase." Furthermore, when the resulting kneaded product (polymer alloy) is kneaded with the microvaristor, the matrix is prevented from entering between the microvaristor and the island-form conductive dispersed phase because the second resin material is more wettable to the microvaristor than the first resin material is. The microvaristor particles are therefore electrically contacted with each other via the island-form conductive dispersed phase, without being insulated by the matrix. Hence, the resin material of the present invention produces characteristics of excellent surge resistance to large current.

It is not required to use a first resin material that is less wettable to a microvaristor as long as the condition is satisfied that the second resin material is more wettable to the microvaristor than the first resin material is. Hence, the surface of the microvaristor produces favorable insulating characteristics without the formation of a void (bubble) on the surface of the microvaristor, while insulation breakdown resulting from electric discharge can be prevented from occurring.

A non-ohmic resistor having a desired shape, such as a housing of an electronic component or electrical equipment, a board for an electric circuit, a sheath of an electric cable, or a coating of an electric wire or the like can be obtained using this resin material. Injection molding can be preferably used in the preparation of these articles.

To electrically sufficiently contact the microvaristor particles with each other via the island-form conductive dispersed phase, it is necessary to control the island-form conductive dispersed phase in the resin material and it is desirable that its volume ratio should be 1% or more.

It is desirable to use a thermoplastic resin in each of the first resin material and the second resin material. In this case, a kneaded product of the first resin material and the second resin material is kneaded with a microvaristor, and the resulting material is used and mixed with a cross-linking agent, followed by molding so that the resin material can be cured in the respective shape.

A resin having conductivity in itself (e.g., polyacetylene) can be used in the second resin material. Alternatively, a resin provided with conductivity by the addition of a conductive powder to an insulating resin may be used.

To obtain a high conductivity, it is required to mix a conductive powder thereinto at a high density. Since very small particles of a powder also have a large amount of oil absorbed, high-density kneading is not easy.

Thus, property in which a conductive powder tends to be unevenly distributed in a resin having a polarity is utilized. In the present invention, a nonpolar resin is used in the first resin material serving as the matrix, and a polar resin is used in the second resin material serving as the dispersed phase. By an approach of kneading the nonpolar resin and the polar resin with a conductive powder at the same time, the conductive powder temporarily mixed into the resin of the matrix is gradually taken into the dispersed phase to render the dispersed phase conductive. Such a method can be adopted in the present invention. As a result, a dispersed phase having a high conductivity can be easily obtained.

A polyolefin resin, polyphenylene sulfide, polystyrene, or the like can be used as the nonpolar resin in the first resin material. In this context, examples of the polyolefin resin include polyethylene and polypropylene, or the like. Examples of the polar resin in the second resin material include nylon, polyethylene terephthalate (PET), polybutylene terephthalate (PBT), and polycarbonate, or the like. Although the conductive powder can be used as it is without particular treatment, the conductive powder rendered easily spreadable in the polar resin by the surface treatment of the particles of the conductive powder with a coupling agent may be used.

For example, a powder of carbon, a powder of a metal such as gold, silver, copper, nickel, palladium, or platinum, a powder of a conductive oxide such as tin oxide or an oxide superconductive material, a powder of a conductive carbide such as silicon carbide, or a powder of a conductive nitride such as titanium nitride can be used as the conductive powder.

A microvaristor composed mainly of zinc oxide, barium titanate, strontium titanate, silicon carbide, tin oxide, or the like can be used as the microvaristor.

It is desirable that at least a portion of the microvaristor particles should be nonspherical. This can increase the number of points of contact between the microvaristor particles (via the island-form conductive dispersed phase) as compared with spherical microvaristor particles.

The method for producing a resin material according to the present invention is a method for producing a resin material having non-ohmic properties in which current rapidly increases with increase in voltage, comprising kneading an insulating first resin material with a conductive second resin material which is incompatible with the first resin material and is more wettable to a microvaristor than the first resin material is, and kneading the resulting kneaded product with a microvaristor.

In the present invention, a nonpolar resin is used in the first resin material serving as the matrix, and a polar resin is used in the second resin material serving as the dispersed phase. By an approach of kneading these resins with a conductive powder at the same time, the conductive powder temporarily mixed into the resin of the matrix is gradually taken into the dispersed phase to render the dispersed phase conductive. Such a method can be adopted in the present invention. As a result, a dispersed phase having high conductivity can be easily obtained.

Although a very small amount of the conductive powder may remain in the first resin material, characteristics as a varistor are maintained because such a very small amount of the conductive powder does not cause percolation.

Effects of the Invention

According to the present invention, a resin material having non-ohmic properties which has favorable characteristics as a varistor, permits injection molding, and has a high degree of molding freedom and also high impact resistance, a method for producing the same, and a non-ohmic resistor using the resin material can be obtained.

BRIEF DESCRIPTION OF DRAWINGS

FIG. 1 is a flowchart showing a method for producing a resin material, which is one Example of the present invention.

FIG. 2A is a schematic diagram of the resin material of the present Example. FIG. 2B is a diagram showing a main current pathway in the resin material.

FIG. 3 is a graph showing results of measuring the voltage-current (V-I) characteristics of samples prepared in Experiment 1.

FIG. 4 is a graph showing results of measuring the V-I characteristics of samples prepared in Experiment 2 compared on the basis of difference in microvaristor particle size.

FIG. 5 is a graph showing the results of measuring the V-I characteristics of samples prepared in Experiment 2 compared on the basis of volume ratio of the microvaristor.

FIG. 8 is a graph showing results of measuring the average particle size (median) of the island-form conductive dispersed phase 12 as to the samples prepared in Experiment 4.

DESCRIPTION OF EMBODIMENTS

Figure 6:
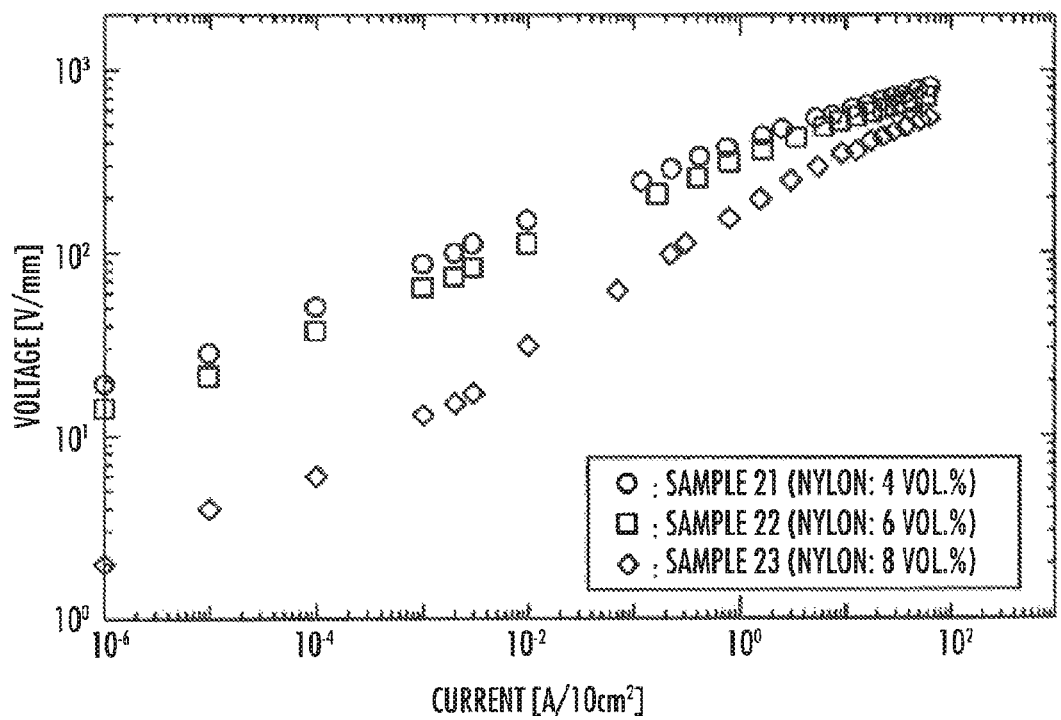
FIG. 6 is a graph showing results of measuring the V-I characteristics of samples prepared in Experiment 3.

Examples of the resin material having non-ohmic properties (hereinafter, simply referred to as the "resin material") and the method for producing the same, and the non-ohmic resistor according to the present invention will be described with reference to FIGS. 1 to 8.

EXAMPLES

First, Example of the method for producing a resin material and a non-ohmic resistor will be described with reference to FIG. 1. In the present Example, a polyethylene was used as the first resin material; nylon (main-phase resin) in which a carbon powder (conductive powder) was mixed was used as the second resin material; and polycrystal particles obtained by the sintering reaction of ZnO with an additive was used as the microvaristor. The carbon powder may be used after hydrophilic surface treatment of the particles with a coupling agent, but may be used as it is without such treatment. The microvaristor was obtained by a general spray drying method and used after being sintered and passing through a sieve having a mesh (mentioned later) of a predetermined size. The volume of the second resin material was set to less than 16% of the total volume of the second resin material and the first resin material.

The first resin material and the second resin material are kneaded at a temperature of 190 to 230° C. (step S1). In this operation, two-stage mixing of mixing the main-phase resin and the conductive powder to prepare the second resin material and then mixing the second resin material with the first resin material may be carried out. Alternatively, the kneading of three materials, i.e., the first resin material, the main-phase resin, and the conductive powder, at the same time can shorten the amount of time and, furthermore, can easily yield a dispersed phase having a high density of the conductive powder.

Then, the obtained mixture is molded into pellet (step S2). Next, this pellet is kneaded with the microvaristor (step S3). In this way, a resin material 10 of the present Example is obtained. Then, a cross-linking agent is added thereto, followed by injection molding to obtain a non-ohmic resistor (step S4).

Since polyethylene used as the first resin material and nylon used as the main-phase resin of the second resin material are incompatible with each other, the first resin material and the second resin material are separate from each other even after mixing. Also, since polyethylene is a nonpolar resin and nylon is a polar resin, the conductive material carbon is unevenly distributed in the nylon. As a result, in the obtained resin material 10, as shown in FIG. 2A, an island-form conductive dispersed phase 12 made of the second resin material having a smaller volume than that of the first resin material is formed in a dispersed manner in a matrix 11 made of the first resin material.

In the resin material 10, as shown in FIG. 2B, the island-form conductive dispersed phase 12 and a microvaristor 13 are contacted with each other to form a pathway of current 19 where the particles of the microvaristor 13 are electrically connected with each other via the island-form conductive dispersed phase 12. The electrical characteristics (i.e., non-ohmic properties) of the resin material 10 are exerted when the current flows in the interface between ZnO particles 131 and a grain boundary layer 132 in the microvaristor 13.

In the resin material 10 of the present Example, nylon as the second resin material is more wettable to the microvaristor 13 than polyethylene as the first resin material is. This prevents the matrix 11 from entering between the microvaristor 13 and the island-form conductive dispersed phase 12. The particles of this microvaristor 13 are electrically contacted with each other via the island-form conductive dispersed phase 12. In this way, the resin material 10 of the present Example produces characteristics of excellent surge resistance to large current.

The wettability of polyethylene as the first resin material to the microvaristor 13 is lower than that of the second resin material, as mentioned above, but is not low enough to be rejected by the surface of the microvaristor 13. Hence, the matrix 11 can cover the surface of the microvaristor 13 at sites other than the points of contact where the particles of the microvaristor 13 are contacted with each other via the island-form conductive dispersed phase 12. This can prevent the current from flowing in the surface layer of the microvaristor 13. Thus, favorable insulating characteristics against small current can be obtained.

Since the island-form conductive dispersed phase 12 has nearly spherical particles, percolation rarely occurs between the particles of the island-form conductive dispersed phase 12. Thus, the island-form conductive dispersed phase 12 can have a high density. Hence, the microvaristor 13, which is solid matter, can have a small volume ratio. This permits injection molding and can enhance the degree of molding freedom. This can also enhance impact resistance.

Hereinafter, results of experiments conducted on samples prepared in the present Example will be described.

Experiment 1

In Experiment 1, four samples differing in parameters (1) to (3) related to materials given below were prepared. The microvaristor 13 was used after passing through a sieve having a mesh size of 45 μm.
<Material Parameter>
(1) Density (volume percentage) of the second resin material occupying the whole raw material
(2) Density (weight percentage) of carbon occupying the second resin material on the assumption that all particles of carbon are unevenly distributed in the second resin material
(3) Density (volume percentage) of the microvaristor 13 occupying the whole raw material The values of the material parameters of each sample are shown in Table 1.

TABLE 1

| Sample No. | (1) Second resin material occupying whole raw material [vol. %] | (2) Carbon occupying second resin material [wt. %] | (3) μ-Varistor occupying whole raw material [vol. %] |
|---|---|---|---|
| 1 | 1 | 15 | 30 |
| 2 | 3 | 15 | 40 |
| 3 | 2 | 15 | 40 |
| 4 | 3 | 20 | 38 |

*"μ-varistor" = microvaristor

The V-I characteristics were measured for each sample of Table 1. In the present Example, direct-current voltage was applied to the sample when the obtained current fell within the range of approximately $1 \times 10^{-2}$ A/10 cm$^2$ or lower, and impulse voltage was applied to the sample so as to attain the flow of large current when the current fell within the range of higher than approximately $1 \times 10^{-2}$ A/10 cm$^2$. The measurement results are shown in FIG. 3. All of the samples have a voltage value as high as tens to hundreds of V per 1 mm even when the current is almost 0. This means that these samples have favorable insulating characteristics against small current. In FIG. 3, the current is indicated at a logarithm scale, whereas the voltage is indicated at a linear scale. This diagram means that a rise in voltage is suppressed even if the current is increased. Specifically, these measurement results indicate that samples 1 to 4 have non-ohmic properties.

Experiment 2

Next, samples having a higher second resin material content than that of the samples of Experiment 1 were prepared, and results of measuring their V-I characteristics are shown. For sample preparation, first, 91.3% by volume of polyethylene, 8.0% by volume of nylon, and 0.680% by volume of carbon (the total of these numeric values is not 100% by volume in terms of the relationship of significant figures) were kneaded at the same time at 200° C. to prepare a polymer alloy. Next, this polymer alloy was mixed with a ZnO microvaristor 13 at a volume ratio shown in Table 2 under temperature conditions of 190° C. to obtain each sample. The microvaristor 13 used was three types having a particle size that fell within the range of 10 to 20 μm, 20 to 30 μm, or 30 to 44 μm by sieving.

TABLE 2

| Sample No. | Polymer alloy occupying whole raw material [vol. %] | Nylon occupying whole raw material [vol. %] | Microvaristor occupying whole raw material [vol. %] | Particle size of microvaristor [μm] |
|---|---|---|---|---|
| 11 | 90 | 7.2 | 10 | 10-20 |
| 12 | 90 | 7.2 | 10 | 20-30 |
| 13 | 90 | 7.2 | 10 | 30-44 |
| 14 | 80 | 6.4 | 20 | 10-20 |
| 15 | 80 | 6.4 | 20 | 20-30 |
| 16 | 80 | 6.4 | 20 | 30-44 |
| 17 | 70 | 5.6 | 30 | 10-20 |
| 18 | 70 | 5.6 | 30 | 20-30 |
| 19 | 70 | 5.6 | 30 | 30-44 |

The results of the experiment of the V-I characteristics are shown in the graphs of FIGS. 4 and 5. In these graphs, the current and the voltage are both indicated at a logarithm scale. In the case where the V-I characteristics can be represented by $I=(V/C)^\alpha$ (α: index of non-ohmic properties, C: constant), the graph has a linear form, and a reciprocal of the slope of the line corresponds to the index α of non-ohmic properties. A larger index α of non-ohmic properties means better non-ohmic properties in which a rise in voltage is suppressed even if the current is increased.

In FIG. 4, samples having an equal volume ratio of the microvaristor 13 are summarized in one graph (the number of graphs: 3). In each graph, difference in V-I characteristics depending on difference in the particle size of the microvaristor 13 is shown. From the graphs of FIG. 4, when the samples having an equal volume ratio of the microvaristor 13 are compared, the sample having the intermediate particle size of 20 to 30 μm of the microvaristor 13 among the three types has the best insulating characteristics (highest voltage) against small current and a large index α of non-ohmic properties in all cases.

In FIG. 5, samples having an equal particle size of the microvaristor 13 are summarized in one graph (the number of graphs: 3). In each graph, difference in V-I characteristics depending on difference in the volume ratio of the microvaristor 13 is shown. From the graphs of FIG. 5, when the samples having an equal particle size of the microvaristor 13 are compared, a lower volume ratio offers better insulating characteristics (higher voltage) against small current in all cases within the volume ratio range (10 to 30% by volume) of the microvaristor 13 in the prepared samples. The sample having the intermediate volume ratio (20% by volume) of the microvaristor 13 among the three types has the largest index α of non-ohmic properties.

Experiment 3

Next, as shown in Table 3, three polymer alloys differing in the volume ratios of polyethylene, nylon, and carbon were prepared, and these polymer alloys were each mixed with a ZnO microvaristor 13 to prepare three samples (samples 21 to 23). For polymer alloy preparation, the materials were mixed at 200° C. The microvaristor used had a particle size of 10 to 20 μm. The microvaristor 13 and each polymer alloy were mixed at 190° C., and the mixing ratio thereof was set to 70% by volume of the polymer alloy and 30% by volume of the microvaristor 13. One (sample 23 in Table 3) of these three samples is the same as the sample 17 of Table 2.

TABLE 3

| Sample No. | Polyethylene occupying polymer alloy [vol. %] | Nylon occupying polymer alloy [vol. %] | Carbon occupying polymer alloy [vol. %] |
| --- | --- | --- | --- |
| 21 | 95.3 | 4.0 | 0.68 |
| 22 | 93.3 | 6.0 | 0.68 |
| 23 (17) | 91.3 | 8.0 | 0.68 |

* The total of volume contents in each sample is not 100 vol. % in terms of the relationship of significant figures.

The results of the experiment of the V-I characteristics of the samples 21 to 23 are shown in the graph of FIG. 6. As seen from these experiment results, a smaller content of nylon offers a higher voltage against small current and a larger index α of non-ohmic properties.

Experiment 4

Next, in order to determine the upper limit value and desirable lower limit value of the density of the island-form conductive dispersed phase 12, samples each composed of the matrix 11 and the island-form conductive dispersed phase 12 were prepared such that these samples differed in the volume ratio (density) of the island-form conductive dispersed phase 12 within the range of 0.5% by volume to 16% by volume. The microvaristor 13 was not kneaded into these samples. The same raw materials as in Experiments 1 to 3 were used for the matrix 11 and the island-form conductive dispersed phase 12.

Figure 7:
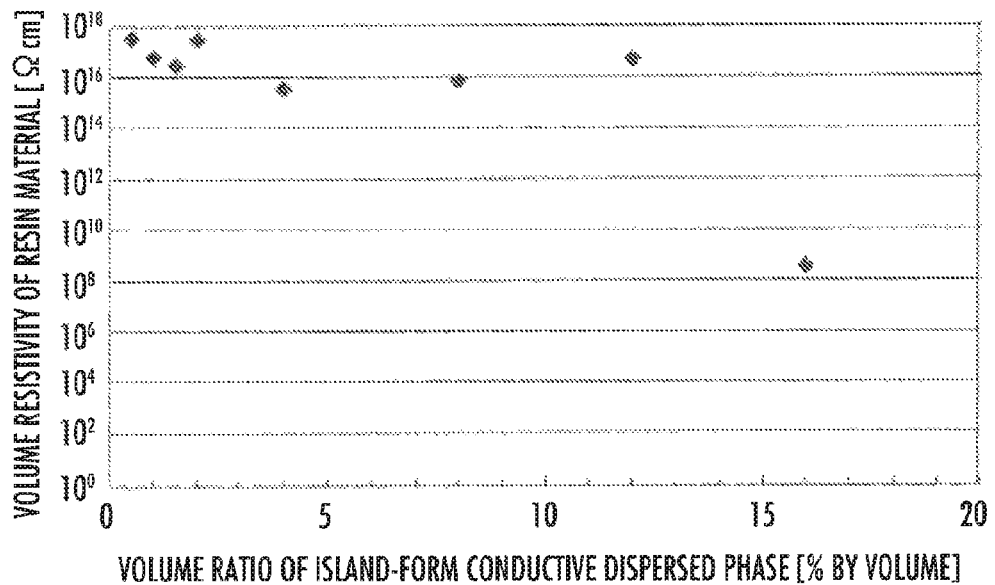
FIG. 7 is a graph showing results of measuring volume resistivity of the whole resin material as to a plurality of samples differing in the volume ratio of an island-form conductive dispersed phase 12, prepared in Experiment 4.

FIG. 7 shows results of measuring the volume resistivity of the whole resin material in each sample. The volume resistivity was the order of $10^8$ Ωcm for the sample having a volume ratio of 16% by volume of the island-form conductive dispersed phase 12 (hereinafter, referred to as the "16% sample"), whereas a volume resistivity of $10^{15}$ to $10^{17}$ Ωcm, which was 7 to 9 number of digits higher, was obtained for the samples (volume ratio of the island-form conductive dispersed phase 12:0.5 to 12% by volume) other than the 16% sample. Significant difference in volume resistivity depending on the volume ratio of the island-form conductive dispersed phase 12 is not observed among the samples other than the 16% sample. These results suggest that the particles of the island-form conductive dispersed phase 12 are electrically separate from each other in the samples other than the 16% sample, whereas percolation occurs due to the island-form conductive dispersed phase 12 in the 16% sample.

FIG. 8 shows results of measuring the average particle size of the island-form conductive dispersed phase 12 in each sample. In this context, the average particle size used was a value of 50% (median) in a cumulative frequency distribution determined by analyzing the scanning electron microscope (SEM) image of the resin material 10. A larger volume ratio of the island-form conductive dispersed phase 12 offers a larger average particle size. In the present Example, the particle sizes of the island-form conductive dispersed phase are read from the two-dimensional image of SEM. If a spherical shape is deformed, the actual size cannot ben correctly measured. Theoretically, the size is infinite at 16%. Percolation might occur due to the island-form conductive dispersed phase 12 in a region around 16% at which the average particle size rapidly increases. It is therefore desirable to set the volume ratio of the island-form conductive dispersed phase 12 outside such a range.

On the other hand, an extremely small ratio of the island-form conductive dispersed phase increases the heterogeneity of the island-form conductive dispersed phase in the matrix. FIG. 8 shows that when the volume ratio of the island-form conductive dispersed phase 12 is close to 1%, the particle size is extremely decreased with decrease in volume ratio.

In a region less than 1%, the particle size is drastically changed, as described above, with slight change in the volume ratio of the island-form conductive dispersed phase. It is therefore difficult to control the particle size of the island-form conductive dispersed phase. This renders the heterogeneity of the island-form conductive dispersed phase more marked. It is therefore desirable that the volume ratio of the island-form conductive dispersed phase is 1% or more.

Next, the relationship of a density x of the microvaristor 13, a density y of the island-form conductive dispersed phase 12 (second resin material), a radius $r_1$ of the microvaristor 13, and radius $r_2$ of the island-form conductive dispersed phase 12 will be discussed theoretically. The radius $r_2$ of the island-form conductive dispersed phase 12 is a value that depends on the kneading conditions for the first resin material and the second resin material during the preparation of the resin material 10, and the MFR (melt flow rate: fluidity index) and surface energy of the first resin material and the second resin material.

First, the total number of particles of the microvaristor 13 contained in the whole resin material 10 is defined as $n_1$, and the total number of particles of the island-form conductive dispersed phase 12 is defined as $n_2$. The average number of particles of the island-form conductive dispersed phase 12 contacted with one particle of the microvaristor 13 is defined as n, and the ratio of the number of particles of the island-form conductive dispersed phase 12 contacted with the microvaristor 13 to the total number of particles of the island-form conductive dispersed phase 12 is defined as p. The following expression holds:

$$n = p \cdot n_2 / n_1 \qquad \text{Expression(1)}$$

In this context, $n_2/n_1$ is indicated by x, y, $r_1$, and $r_2$ as follows:

$$n_2/n_1 = (y/x) \cdot (r_1/r_2)^3 \qquad \text{Expression(2)}$$

It is desirable that one particle of the microvaristor 13 should be contacted with one or more particles on average of the island-form conductive dispersed phase 12. Therefore, from the expressions (1) and (2), the following expression holds:

$$1 \leq n = p \cdot n_2/n_1 = p \cdot (y/x) \cdot (r_1/r_2)^3,$$

$$1/p \leq n_2/n_1 = (y/x) \cdot (r_1/r_2)^3 \qquad \text{Expression(3)}$$

Next, a model is assumed in which the particles of the microvaristor 13 are approximated to spheres each having the radius $r_1$, the particles of the island-form conductive dispersed phase 12 are approximated to circles each having the radius $r_2$, and the surface of each of these spheres is filled with a plurality of the circles. When the ratio of an area $S_2$ attached with the circles to a surface area $S_1$ of the sphere exceeds a given value ϕ, percolation resulting from the continuous linkage of a large number of particles of the microvaristor 13 via the island-form conductive dispersed phase 12 occurs to form a current pathway by which characteristics as a varistor can be exerted. The condition thereof is $$\phi > n \cdot S_2/S_1 = (n \cdot \pi r_2^2)/(4\pi r_1^2) \quad \text{Expression(4)}$$

From the Expressions (1), (3), and (4), the following expression holds:

$$(1/p) \cdot (r_2/r_1)^2 \le (y/x) \cdot (r_1/r_2) < (1/p) \cdot 4\phi \quad \text{Expression(5)}$$

Thus, the appropriate ranges of the values x, y, $r_1$, and $r_2$ can be determined provided that the parameters p and $\phi$ can be determined by computer simulation or the like.

The present invention is not intended to be limited by Examples described above. For example, the materials for the first resin material, the second resin material, and the microvaristor 13 are not limited to those described in Examples, and various combinations of the materials mentioned above can be used. The firing temperature that defines the particle size of the microvaristor 13 itself and the particle size of crystalline grains in the microvaristor 13 or the MFR that defines the particle size of the island-form conductive dispersed phase 12 is not limited to those described above.

In Examples described above, the fired microvaristor 13 was used as it was. Alternatively, a microvaristor obtained by coating with bismuth oxide or a ZnO nanorod in which Co or Mn thermally diffused by heat treatment may be used. This can increase the number of points of contact between the particles of the microvaristor 13 (via the island-form conductive dispersed phase 12) as compared with spherical particles of the microvaristor 13.

A portion of the particles of the island-form conductive dispersed phase 12 may be replaced with particles composed of a conductive powder such as carbon or the like. For these particles, it is desirable to use particles having a size equivalent to the microvaristor particles. It is also desirable that these particles should be spherical, because percolation rarely occurs.

Thermal uniformity within the matrix can be achieved by adding an insulating material having a high thermal conductivity as described below, together with the microvaristor to the matrix. Examples of such an insulating material include aluminum nitride, aluminum oxide, silicon nitride, boron nitride, and magnesium oxide or the like. This can enhance the characteristics as a varistor.

Furthermore, the resin material 10 can be used for purposes other than varistors by replacing the microvaristor 13 with any of other functional powders such as highly thermally conductive insulating materials or the like.

REFERENCE SIGNS LIST

10 . . . Resin material
11 . . . Matrix
12 . . . Island-form conductive dispersed phase
13 . . . Microvaristor
131 . . . ZnO particle
132 . . . Grain boundary layer
19 . . . Current

The invention claimed is:

1. A resin material having non-ohmic properties in which current rapidly increases with increase in voltage, comprising:
   a) an insulating matrix made of a first resin material;
   b) an island-form conductive dispersed phase made of a conductive second resin material which is incompatible with the first resin material and is more wettable to a microvaristor than the first resin material is, wherein the island-form conductive dispersed phase is dispersed in an island form in the matrix and has a volume ratio of less than 16% in the whole resin material; and
   c) the microvaristor comprising ceramic particles having non-ohmic properties, wherein the ceramic particles are dispersed in the matrix and electrically contacted with each other via the island-form conductive dispersed phase.

2. The resin material according to claim 1, wherein the volume ratio of the island-form conductive dispersed phase in the whole resin material is 1% or more.

3. The resin material according to claim 1, wherein at least a portion of the microvaristor particles is nonspherical.

4. The resin material according to claim 1, wherein the second resin material is a main-phase resin in which a conductive powder is mixed.

5. The resin material according to claim 4, wherein the first resin material is a nonpolar resin, and the main-phase resin is a polar resin.

6. The resin material according to claim 5, wherein the first resin material is a resin selected from polyethylene, polypropylene, polyphenylene sulfide, and polystyrene, the main-phase resin is a resin selected from nylon, polyethylene terephthalate, polybutylene terephthalate, and polycarbonate, and the conductive powder is made of a material selected from carbon, gold, silver, copper, nickel, palladium, platinum, tin oxide, an oxide superconductive material, silicon carbide, and titanium nitride.

7. A non-ohmic resistor obtained by molding a resin material according to claim 1 into a predetermined shape.

8. The non-ohmic resistor according to claim 7, wherein the predetermined shape is a shape of any of a housing of an electronic component or electrical equipment, a board for an electric circuit, a sheath of an electric cable, and a coating of an electric wire.

9. A method for producing a resin material having non-ohmic properties in which current rapidly increases with increase in voltage, comprising
   kneading an insulating first resin material with a conductive second resin material which is incompatible with the first resin material and is more wettable to a microvaristor than the first resin material is, and kneading the resulting kneaded product with a microvaristor.

10. A method for producing a resin material having non-ohmic properties in which current rapidly increases with increase in voltage, comprising
   kneading an insulating and nonpolar first resin material with a main-phase resin as a main raw material for a second resin material and a conductive powder at a same time and kneading the resulting kneaded product with a microvaristor.

* * * * *